(12) United States Patent
Ichimaru

(10) Patent No.: US 7,661,944 B2
(45) Date of Patent: Feb. 16, 2010

(54) TIRE VULCANIZING DEVICE

(75) Inventor: Hironobu Ichimaru, Chikugo (JP)

(73) Assignee: Ichimaru Giken Co., Ltd., Chikugo-shi, Fukuoka (JP)

( * ) Notice: Subject to any disclaimer, the term of this patent is extended or adjusted under 35 U.S.C. 154(b) by 111 days.

(21) Appl. No.: 12/089,161

(22) PCT Filed: Oct. 4, 2006

(86) PCT No.: PCT/JP2006/320248

§ 371 (c)(1),
(2), (4) Date: Apr. 3, 2008

(87) PCT Pub. No.: WO2007/043551

PCT Pub. Date: Apr. 19, 2007

(65) Prior Publication Data

US 2009/0162462 A1    Jun. 25, 2009

(30) Foreign Application Priority Data

Oct. 5, 2005    (JP) ............................. 2005-292600

(51) Int. Cl.
*B29C 35/02* (2006.01)
(52) U.S. Cl. .......................... 425/43; 425/48
(58) Field of Classification Search ............... 425/38, 425/43, 48, 52, 58
See application file for complete search history.

(56) References Cited

U.S. PATENT DOCUMENTS

| 3,909,337 A | * | 9/1975 | Yabe | ........................... 425/31 |
|---|---|---|---|---|
| 4,695,234 A | | 9/1987 | Amano et al. | |
| 4,872,822 A | * | 10/1989 | Pizzorno | ....................... 425/48 |
| 5,820,885 A | * | 10/1998 | Irie | ............................ 425/48 |
| 5,853,526 A | * | 12/1998 | Laurent et al. | ................. 425/58 |
| 6,402,491 B1 | * | 6/2002 | Goto | ........................... 425/48 |
| 6,620,367 B1 | * | 9/2003 | Mitamura | .................... 425/38 |
| 6,682,687 B1 | * | 1/2004 | Mitamura et al. | ........... 264/315 |
| 7,001,559 B2 | | 2/2006 | Oobayashi et al. | |

FOREIGN PATENT DOCUMENTS

| EP | 0 270 022 A2 | 6/1988 |
|---|---|---|
| EP | 1 036 646 A2 | 9/2000 |
| JP | 2-37535 | 10/1990 |
| JP | 2002-178333 | 6/2002 |
| JP | 2005-246819 | 9/2005 |

* cited by examiner

*Primary Examiner*—James Mackey
(74) *Attorney, Agent, or Firm*—Dickstein Shapiro LLP

(57) ABSTRACT

A tire vulcanizer is provided in which upper and lower clamp rings can be positioned at a shaping position easily and smoothly with a simple engagement structure. The tier vulcanizer with a vulcanizer body (A) and a shaping unit (B) is configured that the upper and lower clamp rings (5, 6) are connected by an extendable shaft (5a) having an inner shaft (51) and an outer tubular shaft (61) so that the inner shaft is slidably fitted into an inside of the outer tubular shaft. A latch member (53) on the inner shaft is engaged with a step portion (63) on an inner surface of the outer tubular shaft, thereby positioning the upper and lower clamp rings at the shaping position.

1 Claim, 9 Drawing Sheets

TIRE VULCANIZING DEVICE

TECHNICAL FIELD

The present invention relates to a tire vulcanizer in which a green tire is shaped outside a vulcanizer body using a shaping unit and vulcanized in a state that the shaping unit is set in the vulcanizer body.

BACKGROUND ART

In prior art tire vulcanization methods, for shaping a green tire, the outer circumference of a bladder is made in tight contact with the inner circumference of the green tire by setting the green tire is in a center mechanism of a vulcanizer and inflating the bladder of the center mechanism with a pressurized fluid.

Then, the bladder supplied with a high-temperature and pressure fluid is pressed into the inner circumference of the green tire held in a container of the vulcanizer, whereby the green tire is vulcanized by heat from the bladder and the container.

However, such a prior art tire vulcanization method has a problem that since the green tire is set in the center mechanism of the vulcanizer for shaping, pre-vulcanization processing takes a long time, causing a reduction in work efficiency.

In view of solving the above problem, in prior art there has been proposed a tire vulcanizer disclosed in Japanese Laid-open Patent Application Publication No. 2002-178333 which is configured to shape a green tire with a shaping unit outside a vulcanizer body and vulcanize the shaped green tire while the shaping unit is set in the vulcanizer body.

This prior art tire vulcanizer includes a shaping unit for off-line setup, that is, mounting a green tire outside the vulcanizer body and shaping the green tire.

Thus, the use of the shaping unit has an advantage of improved work efficiency since just setting in the vulcanizer body the green tire shaped outside enables immediate start of vulcanization.

However, for shaping the green tire in the shaping unit, it is necessary that the upper and lower clamp rings can be positioned at a bladder extended position at which they are distanced away from each other so that an outer diameter of the bladder is to be smaller than an inner diameter of the green tire and at a shaping position at which they approach each other so that the outer circumference of the bladder is to be made in tight contact with the inner circumference of the green tire.

In this regard, the prior art tire vulcanizer is configured to include a fastener ring in the upper clamp ring, and positions the upper and lower clamp rings by rotating the fastener ring by a motor to thereby engage the fastener ring with the lower clamp ring.

However, there is a problem that a complex fastening structure is needed to rotate the fastener ring by the motor to join the upper and lower clamp rings at the shaping position.

In view of solving the above problem, the present invention aims to provide a tire vulcanizer in which the upper and lower clamp rings can be positioned at the shaping position easily and smoothly with a simple engagement structure.

DISCLOSURE OF THE INVENTION

In view of solving the above problem, a tire vulcanizer according to the present invention (claim 1) is configured to comprise a vulcanizer body having an upper container attached to a bolster plate and a lower container attached to a bottom plate, and a shaping unit in which a green tire is mounted outside the vulcanizer body and which is set in the vulcanizer body with the green tire mounted therein, in which the shaping unit includes a bladder made of inflatable tubular rubber, an upper clamp ring which fixes an upper end of the bladder, a lower clamp ring which fixes a lower end of the bladder, and a fluid port through which a pressurized fluid is supplied/discharged to/from an inside of the bladder; the upper and lower clamp rings are approachably/separably supported so that they are able to be positioned at a bladder extended position and at a shaping position, the bladder extended position being a position at which the upper and lower clamp rings are distanced away from each other so that an outer diameter of the bladder is to be smaller than an inner diameter of the green tire, the shaping position being a position at which the upper and lower clamp rings approach each other so that the outer circumference of the bladder is to be made in tight contact with the inner circumference of the green tire; the shaping unit is set in the vulcanizer body in a shaping state that the outer circumference of the bladder is made in tight contact with the inner circumference of the green tire by supplying a fluid to inside of the bladder from the fluid port and positioning the upper and lower clamp rings at the shaping position; the upper clamp ring is connected with one end of an extendable shaft and the lower clamp ring is connected with the other end of the extendable shaft which is composed of an inner shaft and an outer tubular shaft such that the inner shaft is slidably fitted into an inside of the outer tubular shaft; a latch member is formed on the inner shaft so as to advance/retreat between an engaged position at which the latch member protrudes from an outer circumference of the inner shaft and a contained position at which the latch member does not protrude from the outer circumference of the inner shaft; and a step portion is formed on the inner surface of the outer tubular shaft to be engaged with the latch member, thereby latching the upper and lower clamp rings at the shaping position.

BEST MODE FOR CARRYING OUT THE INVENTION

Figure 5:
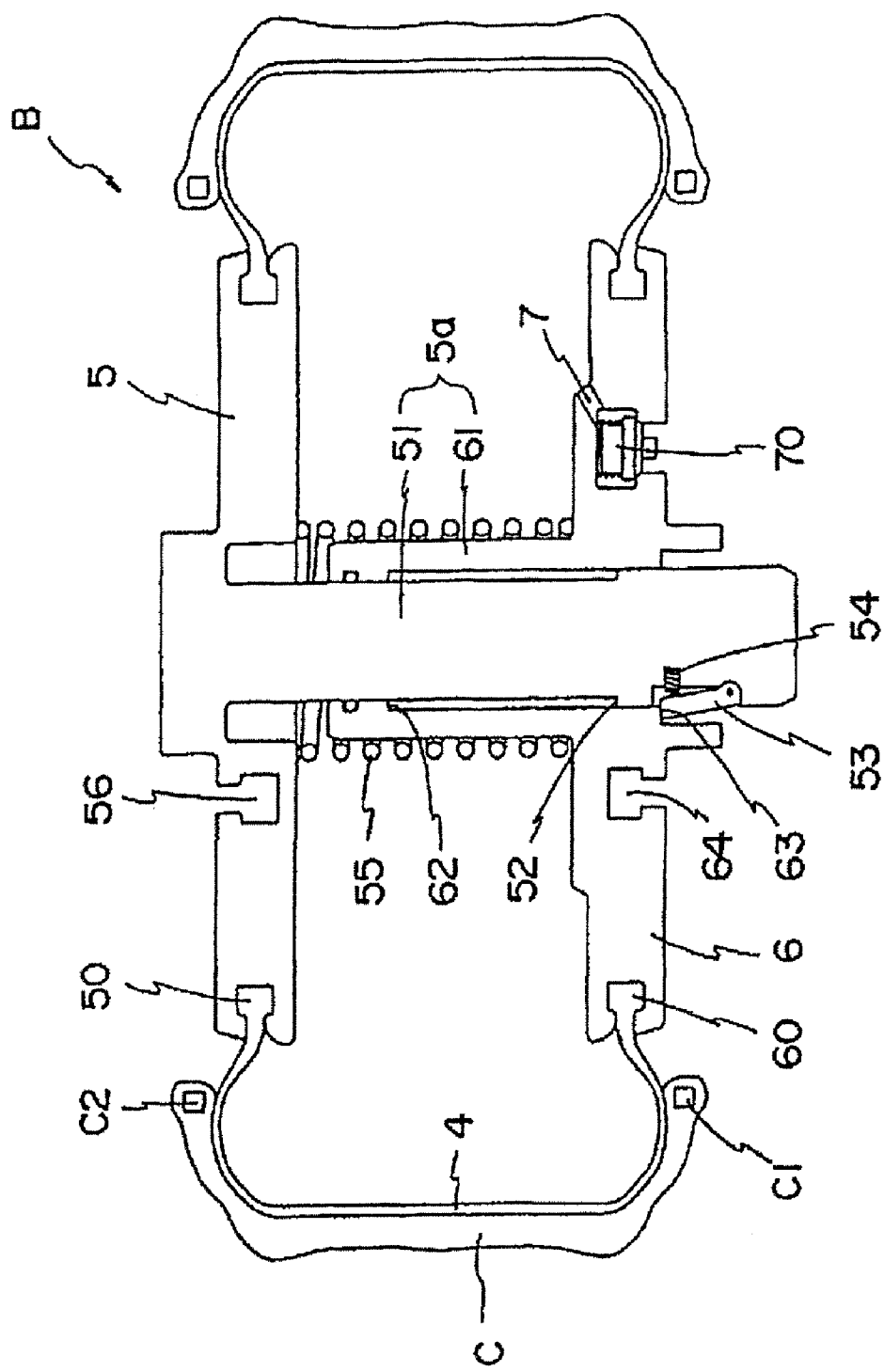
FIG. 5 is a cross section of a shaping unit.
Figure 6:
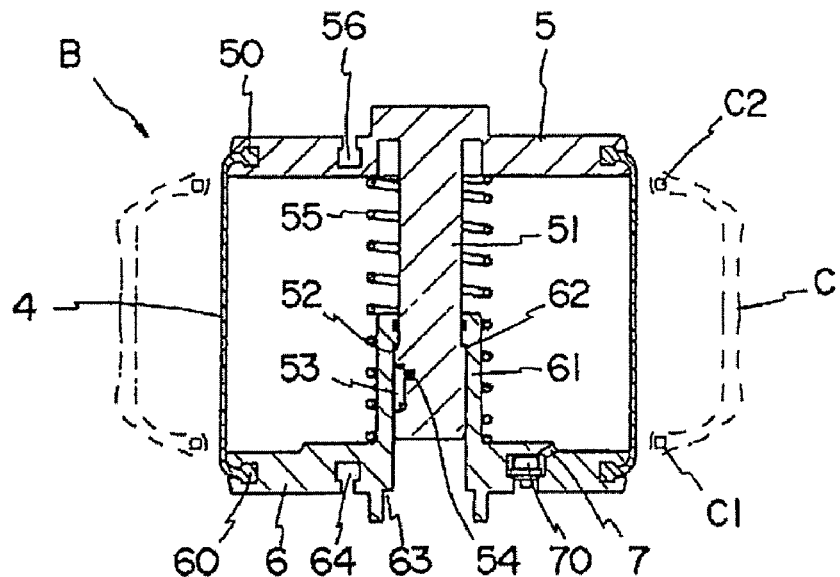
FIG. 6 is a process drawing for describing operation of the shaping unit.
Figure 7:
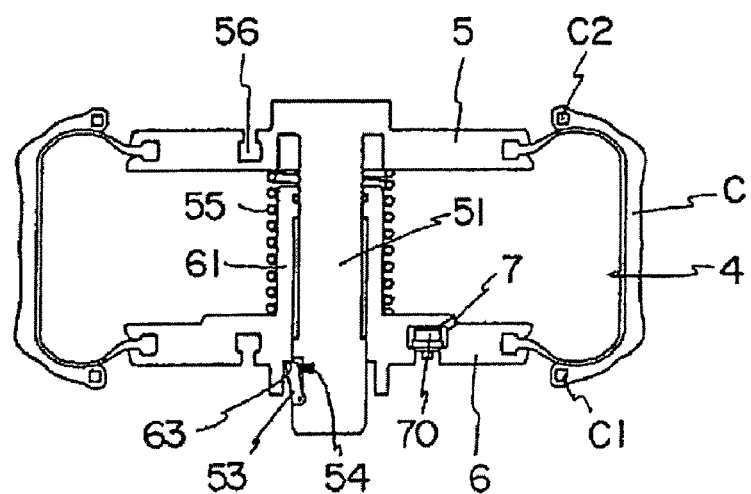
FIG. 7 is a process drawing for describing operation of the shaping unit.
Figure 8:
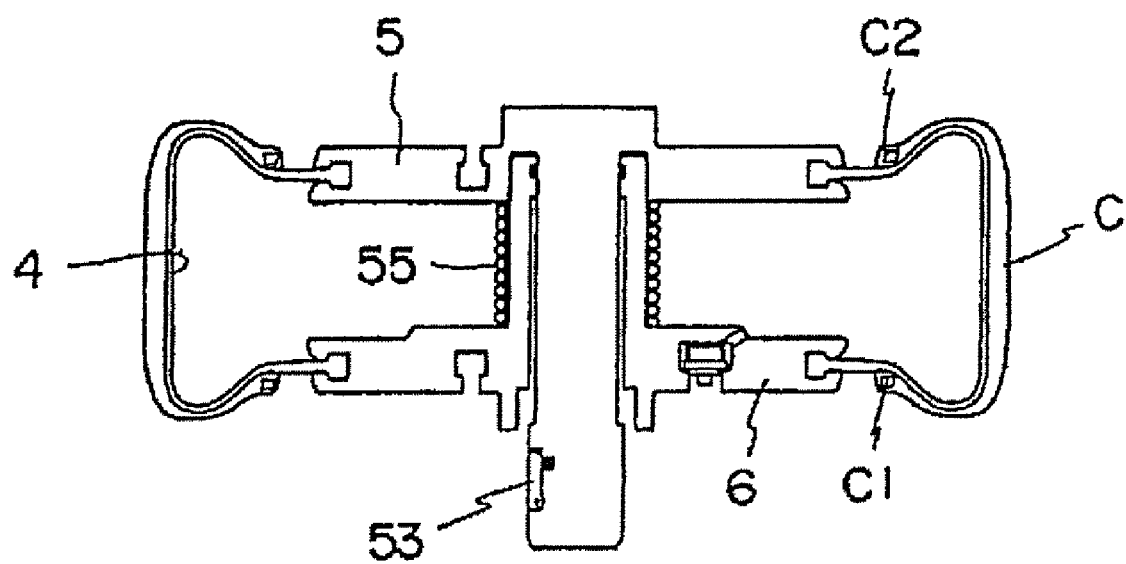
FIG. 8 is a process drawing for describing operation of the shaping unit.

FIGS. 1 to 4 are process drawings for describing a vulcanization method using a tire vulcanizer according to the present invention. FIG. 5 is a cross section of a shaping unit, and FIGS. 6 to 8 are process drawings for describing operation of the shaping unit.

A tire vulcanizer according to the present embodiment comprises a vulcanizer body A and a shaping unit B.

Figure 1:
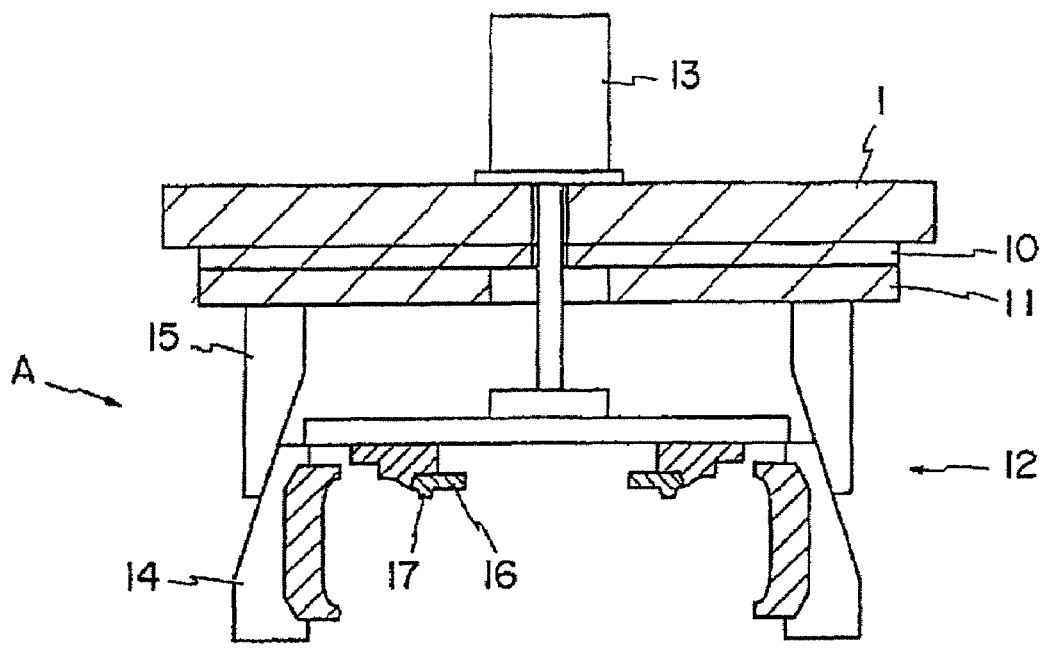
FIG. 1 is a process drawing for describing a vulcanization method using a tire vulcanizer according to the present invention.
Figure 1:
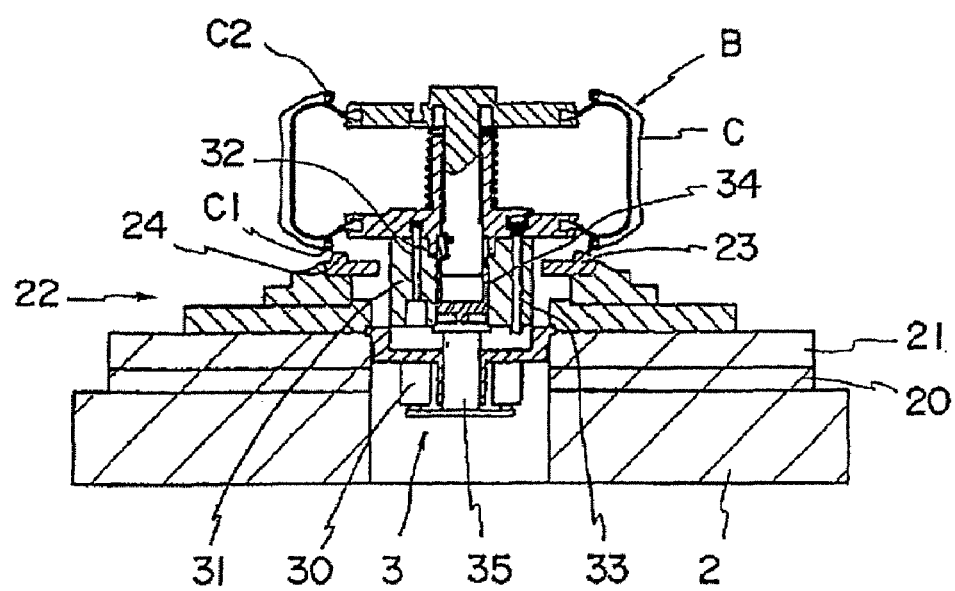

As shown in FIG. 1, the vulcanizer body A comprises an upper container 12 mounted in a bolster plate 1 via an insulator bolster 10 and a bolster platen 11, and a lower container 22 mounted in a bottom plate 2 via an insulator bottom 20 and a bottom platen 21. The bolster plate 1 and the bottom plate 2 are supported in such a manner as to relatively move in a vertical direction.

Figure 2:
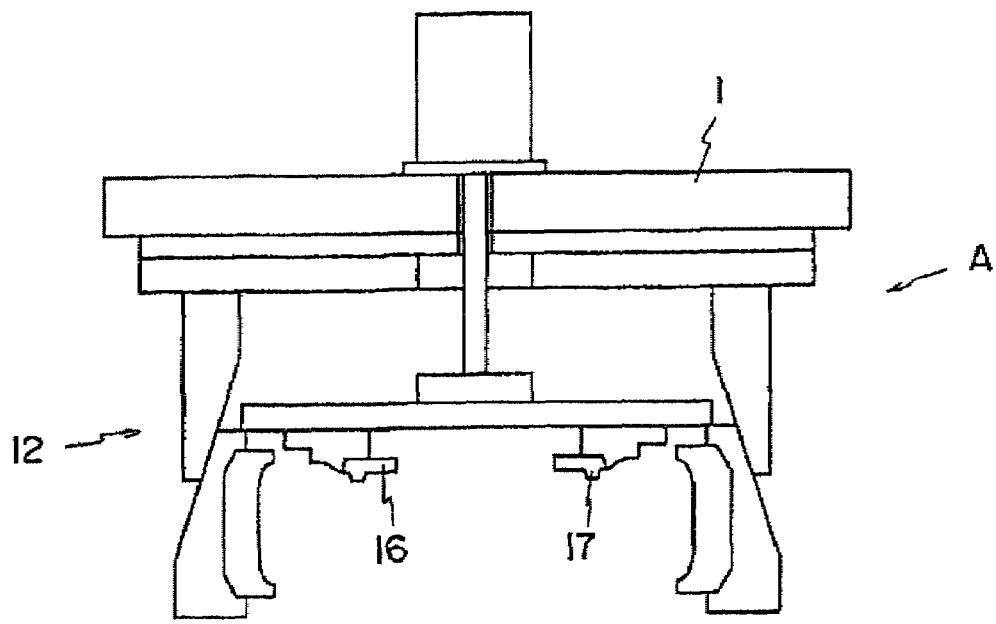
FIG. 2 is a process drawing for describing the vulcanization method using the tire vulcanizer according to the present invention.
Figure 2:
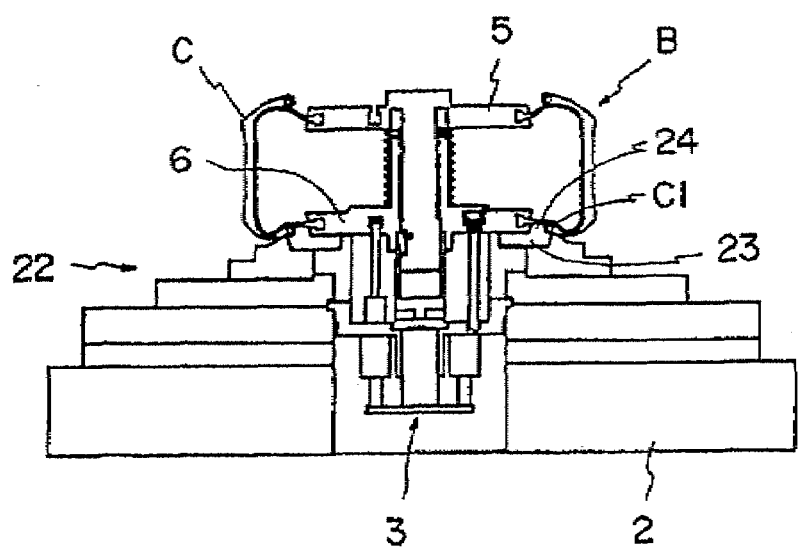
Figure 3:
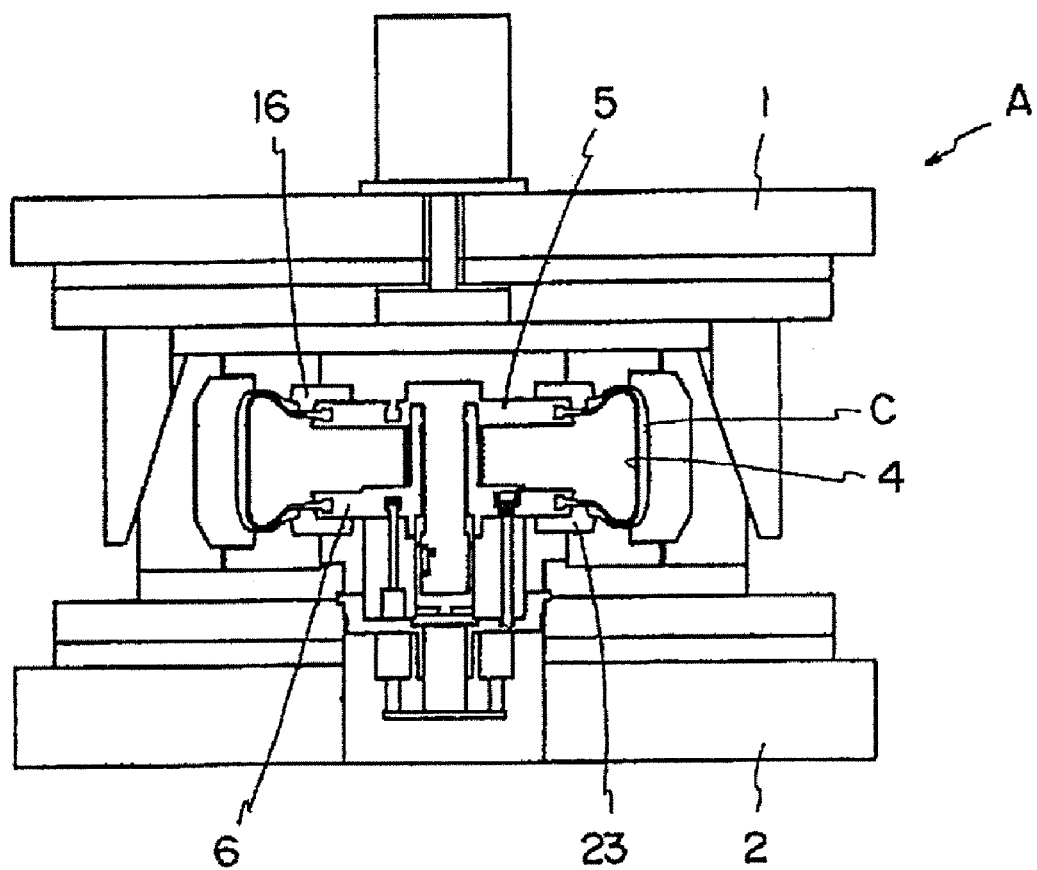
FIG. 3 is a process drawing for describing the vulcanization method using the tire vulcanizer according to the present invention.

In the present embodiment, it is configured that the bottom plate 2 is fixed and the bolster plate 1 is elevated/descended by a not-shown cylinder body between an elevated position (shown in FIGS. 1, 2, 4) and a descended position (shown in FIG. 3).

The upper container 12 has an elevation cylinder 13 mounted in the bolster plate 1. The elevation cylinder 13 has mounted therein a segment mold 14 which is divided into plural segments so that as the elevation cylinder 13 elevates or descends, the segment mold 14 expands or shrinks radially along an expandable guide 15 between an expanded position (shown in FIGS. 1, 2) and a shrunk position (shown in FIGS. 3, 4).

The lower container 22 is mounted on the bottom plate 2 to retain the shaping unit B with the segment mold 14, and provided with a lower bead support ring 23 at the upper end thereof.

The lower bead support ring 23 has, at an outer periphery, a later-described fitting portion 24 which fits in an inner periphery of a lower bead portion C1 of a green tire C when the shaping unit B in a shaping state is set in the vulcanizer body A.

Also, the upper container 12 has an upper bead support ring 16 which has formed therein a fitting portion 17 to fit in an upper bead portion C2 of the green tire C when the shaping unit B in a shaping state is set in the vulcanizer body A.

The center mechanism 3 is provided in the center of the lower container 22. The center mechanism 3 comprises a support plate 31 elevating/descending by the cylinder 30, a clamp rod 32 fixing the shaping unit B on the support plate 31, a fluid channel 33 communicated with a fluid port 7 of the shaping unit B, a lock release tube 34 which holds and retreats a later-described latch nail 53 to such a position as not to protrude from the outer circumference of an upper shaft 51, and a cylinder 35 which elevates/descends the lock release tube 34.

The green tire C is mounted in the shaping unit B outside the vulcanizer body A and the shaping unit B with the green tire C mounted thereon is set in the vulcanizer body A.

As shown in FIG. 5, the shaping unit B comprises a bladder 4 made of inflatable tubular rubber, an upper clamp ring 5 fixing an upper end of the bladder 4, a lower clamp ring 6 fixing a lower end of the bladder 4, and a fluid port 7 through which a pressurized fluid is supplied/discharged to/from the inside of the bladder 4.

The upper clamp ring 5 has a bladder fixation portion 50 in the outer periphery and the upper shaft 51 (inner shaft) vertically placed in the center of the bottom surface while the lower clamp ring 6 has a bladder fixation portion 60 in the outer periphery and a lower tubular shaft 61 (outer tubular shaft) standing in the center of the top surface.

An extendable shaft 5a is formed by the upper shaft 51's slidably fitting in the lower tubular shaft 61, to connect the upper and lower clamp rings 5, 6 approachably/separably.

In addition, the upper and lower clamp rings 5, 6 are latched at a bladder extended position (shown in FIG. 6) at which they are distanced away from each other so that the outer diameter of the bladder 4 is to be smaller than the inner diameter of the green tire C. They are latched at the bladder extended position by engaging a step portion 52 formed on the outer circumference of the upper shaft 51 with a step portion 62 formed on the upper end of the inner surface of the lower tubular shaft 61.

Further, the upper and lower clamp rings 5, 6 are latched at a shaping position (shown in FIGS. 5, 7) at which they approach each other so that the outer circumference of the bladder 4 is to be made in tight contact with the inner circumference of the green tire C.

Here, the latch nail 53 (latch member) attached to the upper shaft 51 is formed to advance/retreat between an engaged position at which it protrudes from the outer circumference of the upper shaft 51 (shown in FIGS. 5, 7) and a contained position at which it does not protrude therefrom (shown in FIGS. 6, 8). Meanwhile, a step portion 63 is formed on the lower end of the inner surface of the lower tubular shaft 61 to engage with the latch nail 53, thereby latching the upper and lower clamp rings 5, 6 at the shaping position.

Also, for vulcanization the upper and lower clamp rings are retained at a vulcanization position (shown in FIG. 8) at which they come closer to each other than the shaping position.

The latch nail 53 is generally biased by a spring 54 to protrude to the engaged position. When the latch nail 53 is positioned inside the lower tubular shaft 61 as shown in FIG. 6, it is retreated to a contained position, pushed by the lower tubular shaft 61, so that the upper shaft 51 and the lower tubular shaft 61 become slidable.

That is, the latch nail 53 advances to the engaged position from the contained position by using the sliding movement (extension/shrinkage) of the upper shaft 51 and the lower tubular shaft 61 along with the approaching/separating of the upper and lower clam rings 5, 6. This eliminates the necessity of a dedicated engaging mechanism for operation of the latch nail 53. Therefore, it is possible to simplify the structure thereof and to reliably position the shaping unit B at the shaping position.

Note that the provision of the spring 55 is not always needed although the spring 55 attached to the upper shaft 51 and the lower tubular shaft 61 is provided to generally bias the upper and lower clamp rings 5, 6 to distance away from each other and be positioned stably.

The fluid port 7 is provided in the lower clamp ring 6 (or upper clamp ring 5) at one or more positions, and incorporates a check valve to prevent a leakage of internal pressure so that it cannot discharge the pressurized fluid from the inside unless it is released externally.

In vulcanization, first the green tire C is mounted in the shaping unit B. Here, the shaping unit is latched at the bladder extended position at which the upper and lower clamp rings 5, 6 are distanced away from each other to engage the step portion 52 and the step portion 62 so that the outer diameter of the bladder 4 is to be smaller than the inner diameter of the green tire C, as shown in FIG. 6.

Thereafter, the green tire C is fitted in the outer periphery of the bladder 4 while the shaping unit B is retained at the bladder extended position. Then, the shaping unit B is positioned at the shaping position by supply of the pressurized fluid from the fluid port 7 and the engagement of the latch nail 53 and the step portion 62 by bringing the upper and lower clamp rings 5, 6 closer to each other. This makes the outer circumference of the bladder 4 be in tight contact with the inner circumference of the green tire C as shown in FIG. 7 (referred to as shaping).

Since the lower bead portion C1 of thus-shaped green tire C is not supported, the green tire C is free from deformation caused by the lower bead portion C1 being supported. Accordingly, it is free from positional and directional displacements.

Next, after the green tire C is shaped by the shaping unit B as above, the shaping unit B is set in the vulcanizer body A to vulcanize the green tire C. When the shaping unit B is transferred from a working position (not shown) at which the green tire C is mounted therein to the vulcanizer body A by a transfer device, a clamp of the transfer device is locked with a clamp groove 56 of the upper clamp ring 5.

In this case, the bolster plate 1 of the vulcanizer body A is retained at the elevated position and the upper container 12 is retained at the expanded position, as shown in FIG. 1. Here, the shaping unit B is placed on the support plate 31 of the center mechanism 3 and the clamp rod 32 is locked with a clamp groove 64 of the lower clamp ring 6. At this point, the lower bead portion C1 of the green tire C is in a float state without being supported by the lower bead support ring 23.

Then, the support plate 31 of the center mechanism 3 is descended as shown in FIG. 2, so that the lower bead portion C1 of the green tire C is supported by the lower bead support ring 23 and that the shaping unit B is set to fit the fitting portion 24 into the inner periphery of the lower bead portion C1.

As described above, at setting the shaping unit B in the vulcanizer body A, the lower bead portion C1 of the green tire C is supported by the lower bead support ring 23 and the fitting portion 24 is fitted in the inner periphery of the lower bead portion C1, therefore, it is possible to set the green tire C accurately without positional and directional displacements of the lower bead portion.

After the shaping unit B is set in the lower container 22 of the vulcanizer body A as above, the bolster plate 1 of the vulcanizer body A is descended to a descended position and the upper container 12 is shrunk to a shrunk position, as shown in FIG. 3. This leads to holding the shaping unit B by the upper and lower containers 12, 22 at the vulcanization position (shown in FIGS. 3, 8) at which the upper and lower clamp rings 5, 6 come closer than the shaping position.

In this manner, the upper bead portion C2 of the green tire C is supported by the upper bead support ring 16 while the shaping unit B is set to fit the fitting portion 17 in the inner periphery of the upper bead portion C2.

Note that although the engagement of the latch nail 53 with the step portion 63 is released at the vulcanization position, no problem arises since the shaping unit B is held by the upper and lower container 12, 22.

The green tire C is vulcanized by high-temperature and pressure fluid supplied to inside of the bladder 4 from the fluid port 7 via the fluid channel 33 and heat from the containers 12, 22.

Figure 4:
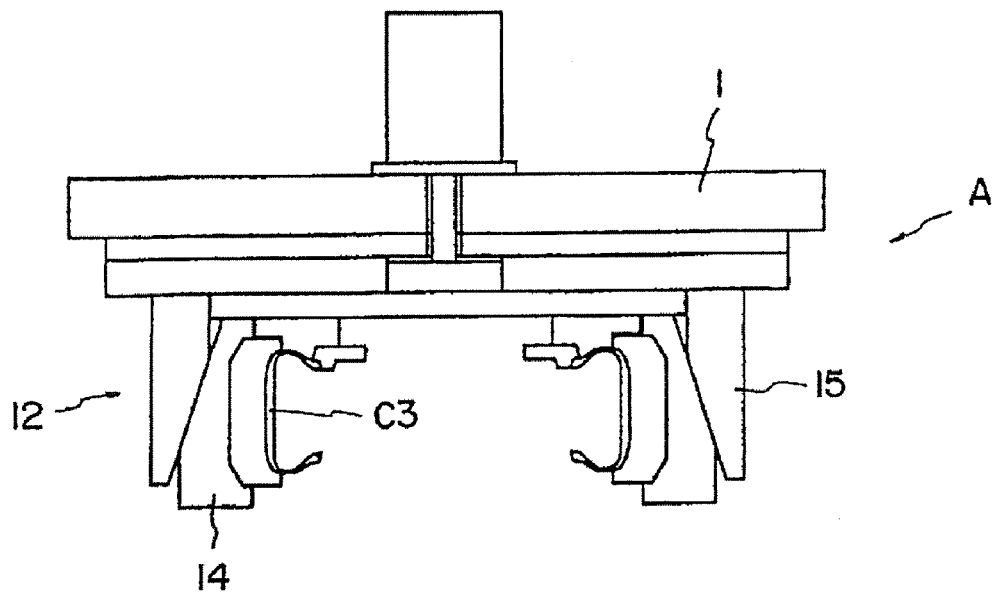
FIG. 4 is a process drawing for describing the vulcanization method using the tire vulcanizer according to the present invention.
Figure 4:
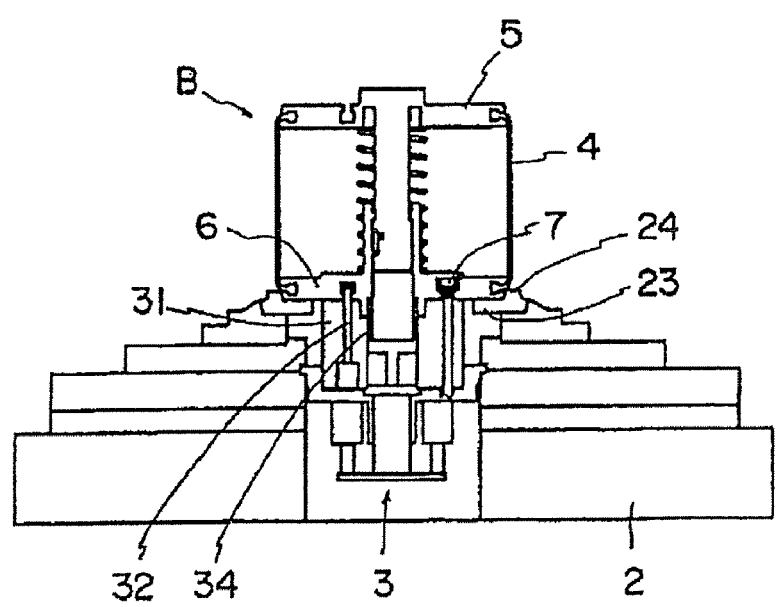

After the above vulcanization of the green tire C, as shown in FIG. 4, the fluid port 7 of the shaping unit B is opened to release the inner pressure with the upper container 12 kept shrunk.

Then, the engagement of the latch nail 53 with the step portion 63 is released by elevating the lock release tube 34 by the cylinder 35, and the shaping unit B is moved away to the extended position when the bolster plate 1 is elevated to the elevated position.

Here, a vulcanized tire C3 retained in the upper container 12 is elevated, removed from the upper container 12 by a not-shown tire fetch device, and carried to a not-shown cooling device.

The shaping unit B locked with the clamp rod 32 is released and removed while the support plate 31 of the center mechanism 3 is elevated, and it is cooled down or carried to the working position at which the green tire C is mounted.

Figure 9:
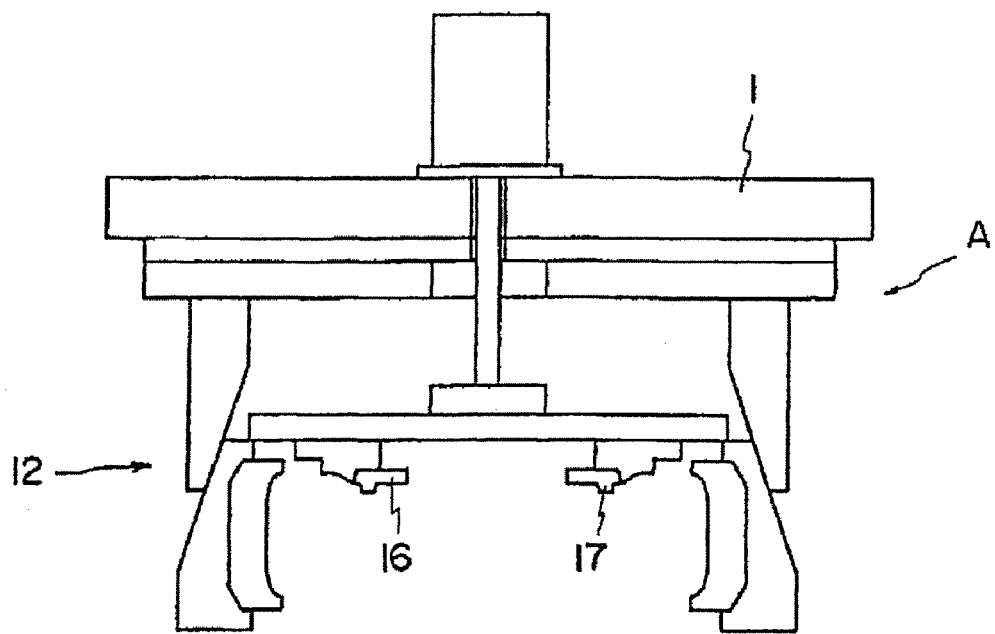
FIG. 9 is a process drawing for describing operation of the shaping unit.
Figure 9:
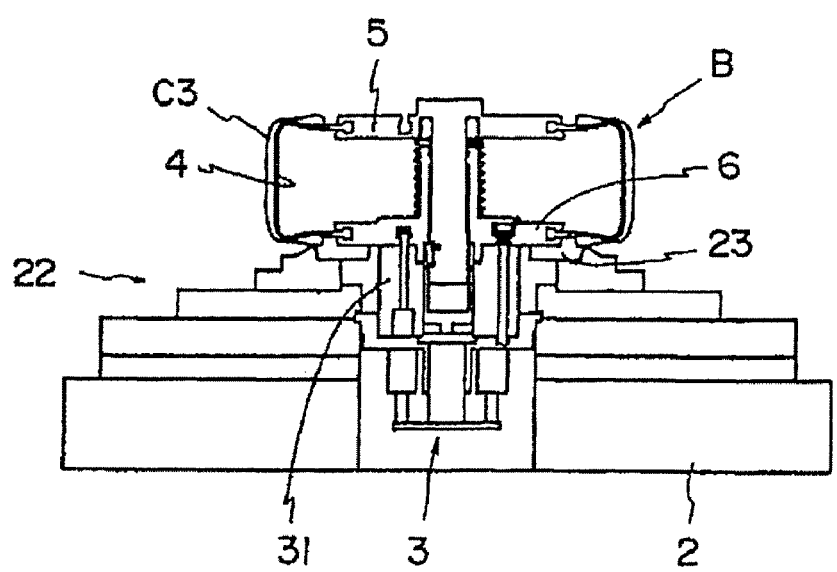

Further, FIG. 9 shows another example of the process after the vulcanization of the green tire C.

In this process, with the upper container 12 kept shrunk, the fluid port 7 of the shaping unit B is opened to release the inner pressure, and then the upper container 12 is expanded while the bolster plate 1 is elevated to the elevated position. At this point, the shaping unit B is returned from the vulcanization position to the shaping position, but the vulcanized tire C3 is still retained in the bladder 4.

Then, with the support plate 31 of the center mechanism 3 elevated, the shaping unit B locked with the clamp rod 32 is released and removed. The vulcanized tire C3 is removed from the shaping unit B and carried to the cooling device.

After the removal of the vulcanized tire C3, the shaping unit B is cooled down or carried to the working position to mount the green tire C. Alternatively, it can be configured that the shaping unit B with the vulcanized tire thereon is cooled down first, and then the vulcanized tire is removed. The shaping unit B without the vulcanized tire C3 is further cooled down or carried to the working position to mount the green tire C.

Figure 10:
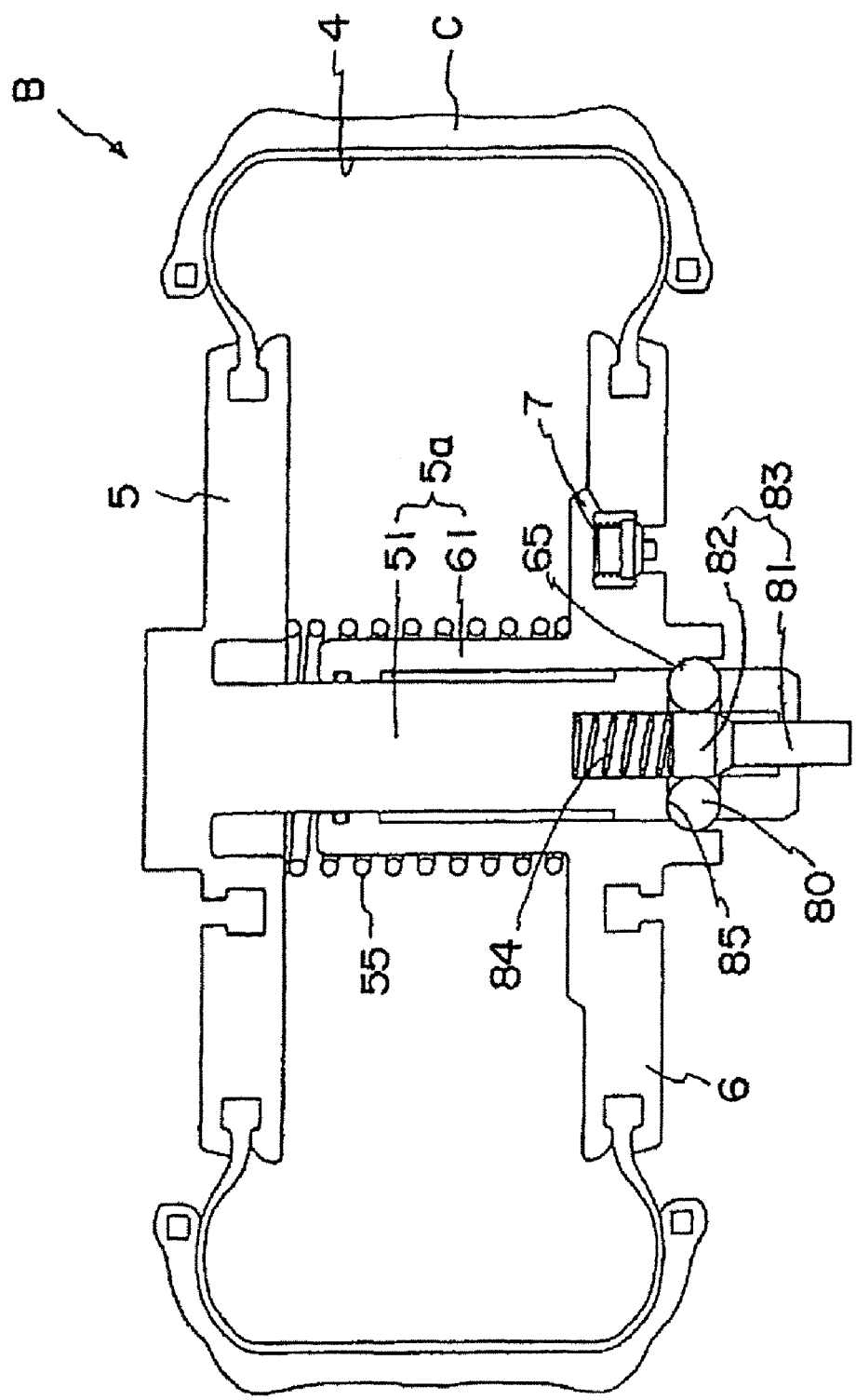
FIG. 10 is a cross section of another shaping unit.

FIG. 10 is a cross section of another shaping unit.

This shaping unit B is configured to include a latch member formed in a ball 80. In this case, a latch/release guide shaft 83 is formed of a small diameter portion 81 and a large diameter portion 82 and is slidably supported in the lower end of the upper shaft 51 in an axial direction. The latch/release guide is generally biased by a spring 84 to a down position (shown in FIG. 10), so that the large diameter portion 82 faces a cave hole into which the ball 80 is fitted.

The rest of the configuration of the shaping unit is the same as that of the shaping unit B in FIG. 5.

Accordingly, when the latch/release guide shaft 83 is at the down position, the large diameter portion 82 pushes the ball 80 to protrude from the outer circumference of the upper shaft 51 and engage with a step portion 65 on the inner surface of the lower tubular shaft 61, thereby latching the upper and lower clamp rings at the shaping position.

In contrast, when the latch/release guide shaft 83 is pushed up to an up position against the spring 84, the small diameter portion 81 is made fitted with the cave hole 86 to return the ball 80 from the outer circumference of the upper shaft 51, thereby releasing the engagement of the ball 80 with the step portion 65 as well as the shaping position.

INDUSTRIAL AVAILABILITY

The tire vulcanizer with the vulcanizer body and the shaping unit according to the present invention is configured that that the upper and lower clamp rings are connected by the extendable shaft having the inner shaft and the outer tubular shaft so that the inner shaft is slidably fitted into an inside of the outer tubular shaft. A latch member on the inner shaft is engaged with a step portion on an inner surface of the outer tubular shaft, thereby positioning the upper and lower clamp rings at the shaping position.

This can accordingly simplify the engagement structure of only the latch member and step portion and remarkably reduce the number of components compared to the prior art structure using the fastener ring. Thereby, it is made possible to reduce manufacture cost and source of failure as well as to smoothly position at the shaping position.

The invention claimed is:

1. A tire vulcanizer comprising a vulcanizer body having an upper container attached to a bolster plate and a lower container attached to a bottom plate, and a shaping unit in which a green tire is mounted outside the vulcanizer body and which is set in the vulcanizer body with the green tire mounted therein, the tire vulcanizer characterized in that:

the shaping unit includes a bladder made of inflatable tubular rubber, an upper clamp ring which fixes an upper end of the bladder, a lower clamp ring which fixes a lower end of the bladder, and a fluid port through which a pressurized fluid is supplied/discharged to/from an inside of the bladder;

the upper and lower clamp rings are approachably/separably supported so that they are able to be positioned at a bladder extended position and at a shaping position, the bladder extended position being a position at which the upper and lower clamp rings are distanced away from each other so that an outer diameter of the bladder is to be smaller than an inner diameter of the green tire, the shaping position being a position at which the upper and lower clamp rings approach each other so that the outer circumference of the bladder is to be made in tight contact with the inner circumference of the green tire;

the shaping unit is set in the vulcanizer body in a shaping state that the outer circumference of the bladder is made in tight contact with the inner circumference of the green tire by supplying a fluid to inside of the bladder from the fluid port and positioning the upper and lower clamp rings at the shaping position;

the upper clamp ring is connected with one end of an extendable shaft and the lower clamp ring is connected with the other end of the extendable shaft which is composed of an inner shaft and an outer tubular shaft such that the inner shaft is slidably fitted into an inside of the outer tubular shaft;

a latch member is formed on the inner shaft so as to advance/retreat between an engaged position at which the latch member protrudes from an outer circumference of the inner shaft and a contained position at which the latch member does not protrude from the outer circumference of the inner shaft; and a step portion is formed on the inner surface of the outer tubular shaft to be engaged with the latch member, thereby latching the upper and lower clamp rings at the shaping position.

* * * * *